(12) United States Patent
Islam

(10) Patent No.: US 10,191,239 B2
(45) Date of Patent: Jan. 29, 2019

(54) HYBRID CABLE TRANSITION ASSEMBLY

(71) Applicant: CommScope Technologies LLC, Hickory, NC (US)

(72) Inventor: Nahid Islam, Westmont, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/684,318

(22) Filed: Aug. 23, 2017

(65) Prior Publication Data

US 2018/0067276 A1  Mar. 8, 2018

Related U.S. Application Data

(60) Provisional application No. 62/383,923, filed on Sep. 6, 2016.

(51) Int. Cl.
| | |
|---|---|
| *G02B 6/44* | (2006.01) |
| *H01B 7/17* | (2006.01) |
| *H01B 11/22* | (2006.01) |
| *H02G 15/06* | (2006.01) |

(52) U.S. Cl.
CPC ......... *G02B 6/4472* (2013.01); *G02B 6/4416* (2013.01); *G02B 6/4433* (2013.01); *H01B 7/17* (2013.01); *H01B 11/22* (2013.01); *H02G 15/06* (2013.01)

(58) Field of Classification Search
CPC .. G02B 6/4416; G02B 6/4432; G02B 6/3817; G02B 6/443; G02B 6/44; H01B 11/22
See application file for complete search history.

(56) References Cited

U.S. PATENT DOCUMENTS

| | | | | |
|---|---|---|---|---|
| 8,909,012 | B2* | 12/2014 | Register, III | ......... G02B 6/4416 |
| | | | | 385/10 |
| 9,679,681 | B2* | 6/2017 | Faulkner | ................ H01B 11/22 |
| 2014/0355941 | A1 | 12/2014 | Burris et al. | |
| 2015/0003794 | A1 | 1/2015 | Elsaadani et al. | |
| 2015/0090487 | A1 | 4/2015 | Efraimsson | |
| 2015/0168657 | A1 | 6/2015 | Islam | |
| 2015/0226927 | A1 | 8/2015 | Islam | |

OTHER PUBLICATIONS

Notification of Transmittal of the International Search Report and the Written Opinion of the International Searching Authority, or the Declaration corresponding to International Application No. PCT/US2017/047919; dated Nov. 29, 2017.

* cited by examiner

*Primary Examiner* — Jennifer Doan
(74) *Attorney, Agent, or Firm* — Myers Bigel, P.A.

(57) ABSTRACT

An assembly for breaking out hybrid power/fiber cable, comprising: a hybrid power/fiber cable comprising a plurality of conductors and a plurality of optical fibers, wherein first lengths of the conductors and the optical fibers are circumferentially surrounded by an armor layer, and wherein a portion of the armor layer is circumferentially surrounded by a cable jacket, and wherein second lengths of the conductors and the optical fibers are free of the armor layer and the cable jacket; a breakout sleeve having an internal bore, a portion of the cable jacket and a portion of the armor layer residing in the internal bore, and portions of the second lengths of the conductors and optical fibers residing in the internal bore; wherein the sleeve is fixed to the cable jacket.

16 Claims, 2 Drawing Sheets

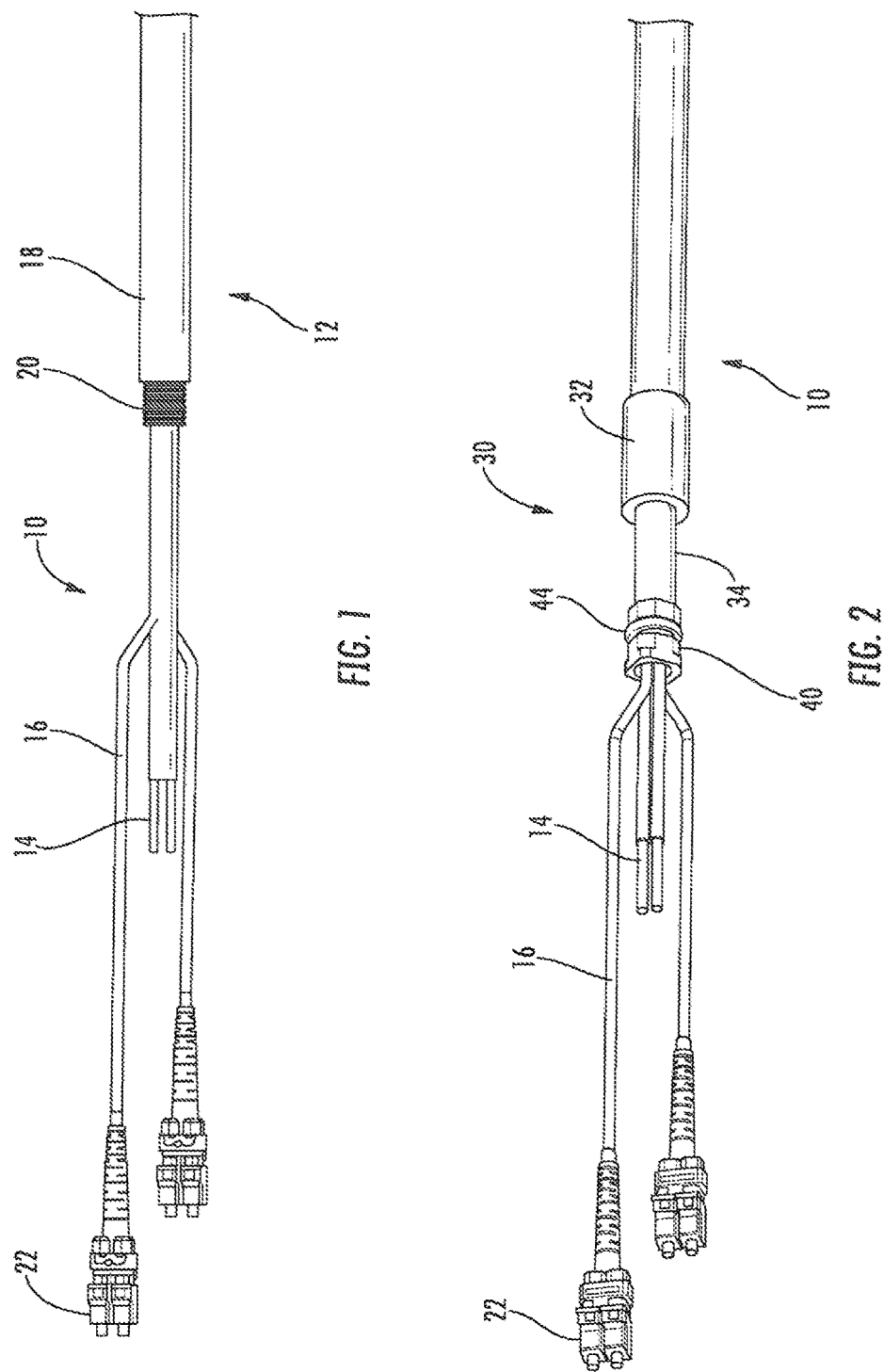

HYBRID CABLE TRANSITION ASSEMBLY

RELATED APPLICATION

The present application claims priority from and the benefit of U.S. Provisional Patent Application No. 62/383,923, filed Sep. 6, 2016, the disclosure of which is hereby incorporated herein in its entirety.

FIELD OF THE INVENTION

The present invention relates generally to power and signal distribution, and more particularly to distribution from trunk cables to furcated cables.

BACKGROUND

Latest developments in technology for delivering power and data in wireless infrastructure use hybrid cables, wherein the term "hybrid cable" refers to a cable that includes both power conductors and one or more fiber optic cords or cables. An exemplary hybrid cable is the HFF cable, available from CommScope, Inc. (Joliet, Ill.). Unlike RF-based systems, a single hybrid trunk cable can be used to power multiple sectors, thereby eliminating multiple runs of RF cable. However, in order to use a single hybrid trunk cable, at some point the trunk cable must transition to juniper cables. Typically, these are distributed aside an enclosure that transitions the trunk conductor gauge to the jumper conductor gauge and connects the optical fibers in the trunk to the optical fibers in the jumper cables. Currently, transitions are achieved by making connections inside the enclosure, requiring it to be opened, cables to be fed/mated to the enclosure, and power and fiber connections to be made, all in the field (e.g., on the top of cell sites near a remote radio unit (RRU)). This practice can create many issues for installers, including time, safety, connection errors (such as loose power connections and/or poor fiber cleaning), and more opportunity for connector damage.

SUMMARY

As a first aspect, embodiments of the invention are directed to an assembly for breaking out hybrid power/fiber cable, comprising: a hybrid power/fiber cable comprising a plurality of conductors and a plurality of optical fibers, wherein first lengths of the conductors and the optical fibers are circumferentially surrounded by an armor layer, and wherein a portion of the armor layer is circumferentially surrounded by a cable jacket, and wherein second lengths of the conductors and the optical fibers are free of the armor layer and the cable jacket; and a breakout sleeve having an internal bore, a portion of the cable jacket and a portion of the armor layer residing in the internal bore, and portions of the second lengths of the conductors and optical fibers residing in the internal bore. The sleeve is fixed to the cable jacket.

As a second aspect, embodiments of the invention are directed to an assembly for breaking out hybrid power/fiber cable, comprising: a hybrid power/fiber cable comprising a plurality of conductors and a plurality of optical fibers, wherein first lengths of the conductors and the optical fibers are circumferentially surrounded by a braided armor layer, and wherein a portion of the armor layer is circumferentially surrounded by a cable jacket, and wherein second lengths of the conductors and the optical fibers are free of the armor layer and the cable jacket; and a breakout sleeve having an internal bore, a portion of the cable jacket and a portion of the armor layer residing in the internal bore, and portions of the second lengths of the conductors and optical fibers residing in the internal bore. The sleeve is fixed to the cable jacket and includes electrical contacts in the internal bore that engage the armor layer.

As a third aspect, embodiments of the invention are directed to an assembly for breaking out hybrid power/fiber cable, comprising: a hybrid power/fiber cable comprising a plurality of conductors and a plurality of optical fibers, wherein first lengths of the conductors and the optical fibers are circumferentially surrounded by an armor layer, and wherein a portion of the armor layer is circumferentially surrounded by a common jacket, and wherein second lengths of the conductors and the optical fibers are free of the armor layer and the cable jacket; and a breakout sleeve having an internal bore, a portion of the cable jacket and a portion of the armor layer residing in the internal bore, and portions of the second lengths of the conductors and optical fibers residing in the internal bore. The sleeve is fixed to the cable jacket. The sleeve includes an expanded section in which the cable jacket and armor layer reside, and a narrower section in which the portions of the second lengths of the conductors and the optical fibers reside. The breakout sleeve is overmolded over the portion of the cable jacket, the portion of the armor layer, and the portions of the second lengths of the conductors and optical fibers.

BRIEF DESCRIPTION OF THE FIGURES

FIG. 1 is a side, partial cutaway view of a hybrid cable transition assembly according to embodiments of the invention.

FIG. 2 is a side perspective view of the assembly of FIG. 1 with a sleeve added thereto.

DETAILED DESCRIPTION

Figure 3:
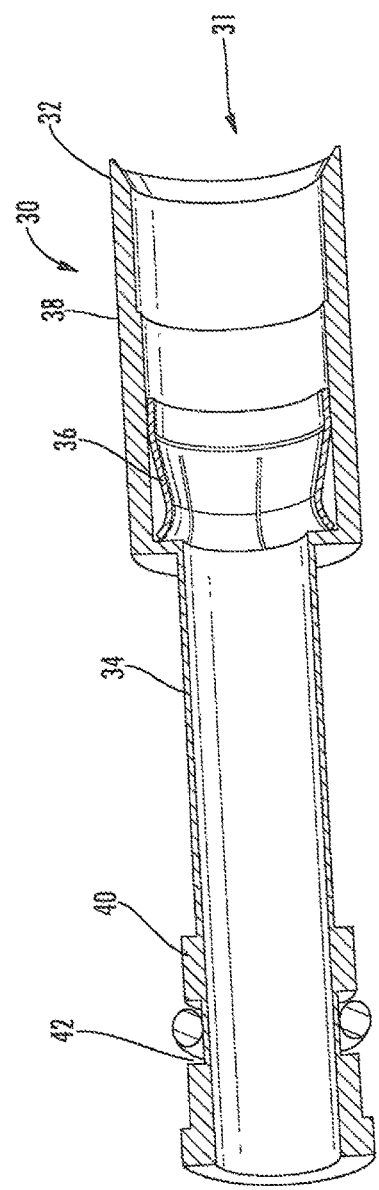
FIG. 3 is an enlarged side section view of the sleeve of FIG. 2.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., an assembly, a housing, a cable, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the drawings, a hybrid cable transition assembly, designated broadly at 10, is shown in FIGS. 1 and 2. The assembly 10 includes a hybrid cable 12 having a plurality of power conductors 14 and a plurality of optical fibers 16. The power conductors 14 and optical fibers 16 are protected by a jacket 18 which overlies, in some embodiments, a braided armor layer 20. As can be seen in FIG. 1, first lengths of the conductors 14 and the optical fibers 16 are circumferentially surrounded by the armor layer 20, and a portion of the armor layer 20 is circumferentially surrounded by the cable jacket 18 (one end of the jacket 18 having been stripped from the armor layer 20). The jacket 18 and armor layer 20 have been stripped such that second lengths of the conductors 14 and the optical fibers 16 are free of the armor layer 20 and the cable jacket 18.

At their free ends, the power conductors 14 are terminated with power connectors of conventional design (not shown). The optical fibers 16 are terminated with optical connectors such as duplex connectors 22. Those skilled in this art will appreciate that other types of power and optical connectors may also be employed.

As can be seen in FIG. 2, the assembly includes a breakout sleeve 30. The breakout sleeve 30 is generally cylindrical and includes an expanded section 32 and a narrower section 34 that surround a continuous internal bore 31 (FIG. 3). The expanded section 32 is sized to fit over the jacket 18 of the cable 12. As can be seen in FIG. 3, a ring of arcuate, flexible contacts 36 formed as fingers is present within the cavity of the expanded section 32. A shoulder 38 is also present on the inner surface of the expanded section 32.

The narrower section 34 has a substantially constant inner diameter. A knob portion 40 radiates outwardly from the end of the narrower section 34. A circumferential clamp groove 42 is present in the knob portion 40.

Figure 4:
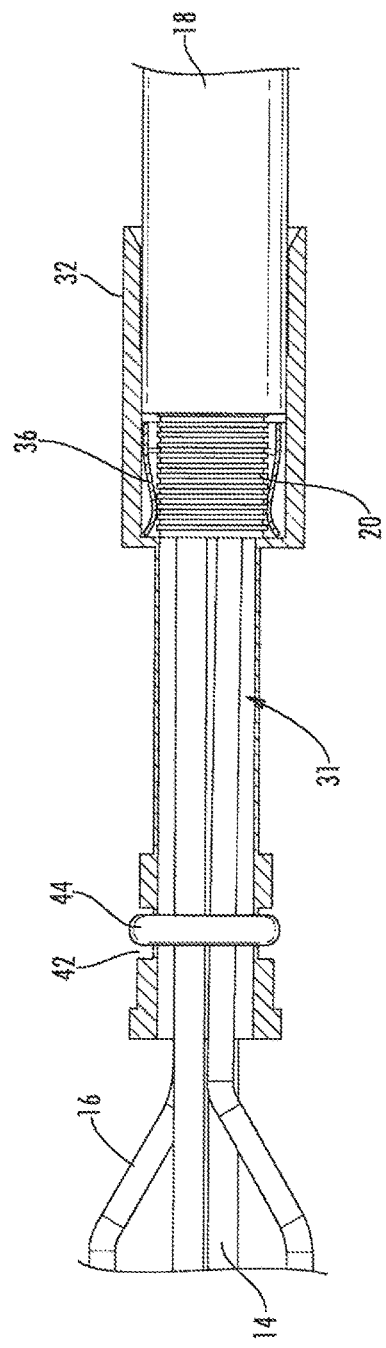
FIG. 4 is an enlarged side section view of the assembly of FIG. 2.

As be seen in FIG. 4, the cable 12 is inserted into the breakout sleeve 30 such that the cable jacket 18 and armor layer 20 reside in the bore 31 of the expanded section 32, with the edge of the jacket 18 abutting the shoulder 38. The armor layer 20 forces the contacts 36 radially outwardly and establishes electrical contact therewith that provides grounding for the assembly 10. The power conductors 14 and optical fibers 16 are routed through the bore 31 and out of the narrower section 34, where their respective connectors may be connected to appropriate equipment, such as a remote radio unit. A clamp 44, such as a ring clamp, may be employed in the clamp groove 42.

The breakout sleeve 30 may be formed of any suitable material, such as a metallic material. In some embodiments, the metallic material may be conductive. In other embodiments, the material may be non-conductive, but may include a grounding feature such as the contacts 36 discussed herein. In still other embodiments, the breakout sleeve 30 may comprise a braided material, wherein the braided material contacts the braided armor layer 20 of the cable 12 and provides a grounding contact. In further embodiments, the breakout sleeve 30 may be formed by overmolding a polymeric material over the end of the cable jacket 18 and the adjacent sections of power conductors 14 and optical fibers 16; in such embodiments, grounding features may be included during overmolding.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An assembly for breaking out hybrid power/fiber cable, comprising:
   a hybrid power/fiber cable comprising a plurality of conductors and a plurality of optical fibers, wherein first lengths of the conductors and the optical fibers are circumferentially surrounded by an armor layer, and wherein a portion of the armor layer is circumferentially surrounded by a cable jacket, and wherein second lengths of the conductors and the optical fibers are free of the armor layer and the cable jacket;
   a breakout sleeve having an internal bore, a portion of the cable jacket and a portion of the armor layer residing in the internal bore, and portions of the second lengths of the conductors and optical fibers residing in the internal bore;
   wherein the breakout sleeve is fixed to the cable jacket and includes arcuate, flexible electrical contacts in the internal bore, and wherein the electrical contacts engage the armor layer.

2. The assembly defined in claim 1, wherein the electrical contacts comprise flexible fingers formed in a ring.

3. The assembly defined in claim 1, wherein the breakout sleeve is formed of a conductive metallic material.

4. The assembly defined in claim 1, wherein the breakout sleeve comprises a braided material.

5. The assembly defined in claim 1, wherein the breakout sleeve includes an expanded section in which the cable jacket and armor layer reside, and a narrower section in which the portions of the second lengths of the conductors and the optical fibers reside.

6. The assembly defined in claim 5, wherein a shoulder is present on an inner diameter of the expanded section of the breakout sleeve, and wherein the jacket abuts the shoulder.

7. The assembly defined in claim 1, wherein the breakout sleeve is overmolded over the portion of the cable jacket, the portion of the armor layer, and the portions of the second lengths of the conductors and optical fibers.

8. An assembly for breaking out hybrid power/fiber cable, comprising:
   a hybrid power/fiber cable comprising a plurality of conductors and a plurality of optical fibers, wherein first lengths of the conductors and the optical fibers are circumferentially surrounded by a braided armor layer, and wherein a portion of the armor layer is circumferentially surrounded by a cable jacket, and wherein second lengths of the conductors and the optical fibers are free of the armor layer and the cable jacket;
   a breakout sleeve having an internal bore, a portion of the cable jacket and a portion of the armor layer residing in the internal bore, and portions of the second lengths of the conductors and optical fibers residing in the internal bore;
   wherein the breakout sleeve is fixed to the cable jacket; and
   wherein the breakout sleeve includes arcuate, flexible electrical contacts in the internal bore; and
   wherein the electrical contacts engage the armor layer.

9. The assembly defined in claim 8, wherein the electrical contacts comprise flexible fingers formed in a ring.

10. The assembly defiled in claim 8, wherein the breakout sleeve includes an expanded section in which the cable jacket and armor layer reside, and a narrower section in which the portions of the second lengths of the conductors and the optical fibers reside.

11. The assembly defined in claim 10, wherein a shoulder is present on an inner diameter of the expanded section of the breakout sleeve, and wherein the jacket abuts the shoulder.

12. An assembly for breaking out hybrid power/fiber cable, comprising:
   a hybrid power/fiber cable comprising a plurality of conductors and a plurality of optical fibers, wherein first lengths of the conductors and the optical fibers are circumferentially surrounded by an armor layer, and wherein a portion of the armor layer is circumferentially surrounded by a common jacket, and wherein second lengths of the conductors and the optical fibers are free of the armor layer and the cable jacket;
   a breakout sleeve having an internal bore, a portion of the cable jacket and a portion of the armor layer residing in the internal bore, and portions of the second lengths of the conductors and optical fibers residing in the internal bore;
   wherein the breakout sleeve is fixed to the cable jacket;
   wherein the breakout sleeve includes arcuate, flexible electrical contacts in the internal bore, and wherein the electrical contacts engage the armor layer; and
   wherein the breakout sleeve includes an expanded section in which the cable jacket and armor layer reside, and a narrower section in which the portions of the second lengths of the conductors and the optical fibers reside; and wherein the breakout sleeve is overmolded over the portion of the cable jacket, the portion of the armor layer, and the portions of the second lengths of the conductors and optical fibers.

13. The assembly defined in claim 12, wherein the electrical contacts comprise flexible fingers formed in a ring.

14. The assembly defined in claim 12, wherein the breakout sleeve is formed of a conductive metallic material.

15. The assembly defined in claim 12, wherein the breakout sleeve comprises a braided material.

16. The assembly defined in claim 12, wherein a shoulder is present on an inner diameter of the expanded section of the breakout sleeve, and wherein the jacket abuts the shoulder.

* * * * *